United States Patent [19]

Hammons et al.

[11] 4,093,953
[45] June 6, 1978

[54] CONTROL STICK ASSEMBLY FOR RADIO CONTROL EQUIPMENT

[75] Inventors: Carl A. Hammons, Vista; Philip O. Kraft, Oceanside, both of Calif.

[73] Assignee: Kraft Systems, Inc., Vista, Calif.

[21] Appl. No.: 664,867

[22] Filed: Mar. 8, 1976

Related U.S. Application Data

[63] Continuation-in-part of Ser. No. 563,380, Mar. 31, 1975.

[51] Int. Cl.$^2$ ............................................. H04B 7/00
[52] U.S. Cl. ................................ 343/225; 74/471 XY; 74/526; 74/527; 200/6 A
[58] Field of Search .............................. 343/225, 228; 200/61.39, 61.76, 61.53; 74/471 XY, 526, 527, 491; 338/128

[56] References Cited

U.S. PATENT DOCUMENTS

| | | | |
|---|---|---|---|
| 3,020,457 | 2/1962 | Kelley | 318/16 |
| 3,308,675 | 3/1967 | Jonsson | 338/128 |
| 3,376,575 | 4/1968 | Peters | 343/225 |

Primary Examiner—John W. Caldwell
Assistant Examiner—Donnie L. Crosland
Attorney, Agent, or Firm—Christie, Parker & Hale

[57] ABSTRACT

A movable control stick is urged by springs toward a neutral position. A radio signal generated responsive to displacement of the control stick is transmitted to a remote element to be controlled. The remote element is displaced responsive to the radio signal. The neutral position of the control stick is moved to the position of the control stick at the time a discrete trim command is given. The control stick is urged toward the neutral position by a pair of lever arms, a first pin attached to the control stick and disposed between the lever arms, a second pin attached to a normally latched, rotatable member and disposed between the lever arms, and the spring extending between the lever arms. Responsive to the trim command, the rotatable member is unlatched to drive the second pin toward the first pin.

16 Claims, 6 Drawing Figures

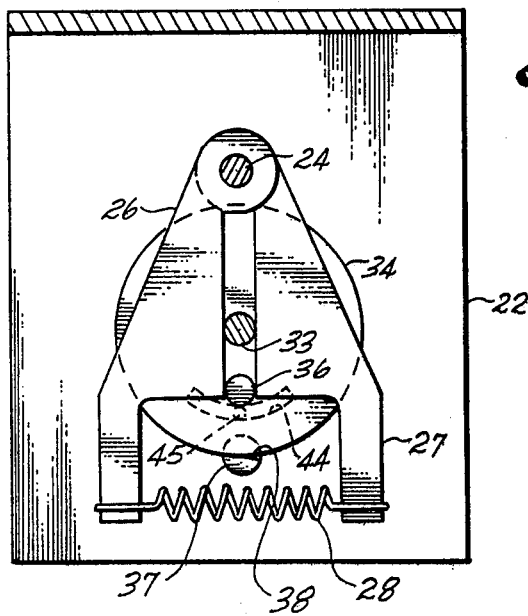
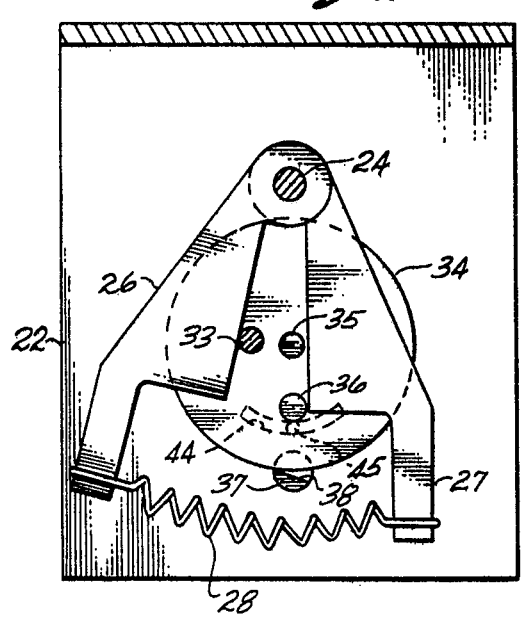
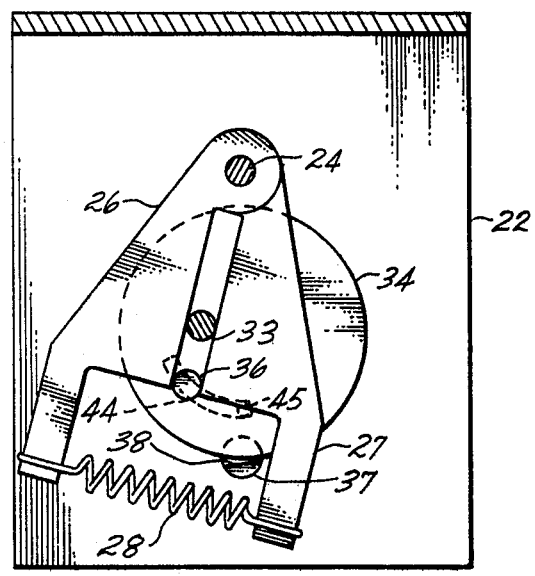

CONTROL STICK ASSEMBLY FOR RADIO CONTROL EQUIPMENT

CROSS REFERENCE TO RELATED APPLICATIONS

This application is a continuation-in-part of application Ser. No. 563,380, filed Mar. 31, 1975.

BACKGROUND OF THE INVENTION

This invention relates to radio control equipment, and, more particularly, to an improved control stick assembly for radio control equipment.

A number of years ago, radio control equipment became available for the purpose of remotely controlling model vehicles, such as airplanes, boats, and automobiles. Since that time, radio control of model vehicles has grown into a very popular recreational activity, and has even become organized into competitive events and contests at the local, national, and international levels. Radio control equipment is also finding nonrecreational uses, such as the control of wheel chairs, materials handling equipment, and so forth.

A typical radio control system comprises a radio transmitter and a control stick assembly operated by a human attendant, and a radio receiver and a servo actuator located at a remote element to be controlled, such as an airplane elevator, an automobile steering wheel, or a boat rudder. As the human attendant moves the control stick, the transmitter generates a radio signal having a characteristic proportional to the displacement of the control stick. This radio signal is intercepted by the receiver and applied to the servo actuator to move the remote element by an amount proportional to the displacement of the control stick. Many radio control systems are equipped for multichannel operation, thus permitting simultaneous control to be exercised over several remote elements, e.g., elevation, aileron, and throttle.

Usually, the proportional characteristic is pulse duration. A potentiometer at the transmitter whose shaft is coupled to the control stick controls the pulse duration of the radio signal. Springs associated with the control stick assembly urge the control stick toward a stationary, neutral position. A trim lever is coupled to the potentiometer housing to permit control of the position of the remote element independent of the control stick displacement. Thus, a temporary change in position of the remote element introduced by the control stick can be maintained permanently by adjusting the trim lever until the control stick is located in the neutral position. This trim maneuver requires the simultaneous coordinated operation of the control stick and the trim lever, which is an awkward and difficult task, particularly in multichannel operation.

SUMMARY OF THE INVENTION

According to the invention, the neutral position of a control stick assembly for radio control equipment is moved to the position assumed by the control stick at the instant of time a discrete trim command is given. Consequently, a trim maneuver can be executed instantly without a coordinated operation of a control stick and a trim lever. When the human attendant operating the control stick wishes to execute a trim maneuver, he simply depresses a button for an instant, while holding the control stick in the position in which the remote element is to be trimmed.

In the preferred embodiment of the invention, a first pin attached to the control stick is disposed between a pair of lever arms. A second pin attached to a normally latched, rotatable member is also disposed between the lever arms. The lever arms are urged together by an interconnecting spring. Responsive to the trim command, the rotatable member is unlatched to drive the second pin toward the first pin and establish a new neutral position for the control stick.

BRIEF DESCRIPTION OF THE DRAWINGS

The features of a specific embodiment of the best mode contemplated of carrying out the invention are illustrated in the drawings, in which:

FIG. 3 is a side sectional view of the control stick assembly shown in FIG. 2;

FIG. 4 is a side sectional view of the control stick assembly shown in FIG. 2 after the control stick has been moved away from the neutral position;

FIG. 5 is a side sectional view of the control stick assembly shown in FIG. 2 after a new neutral position is established at the control stick position shown in FIG. 4.

DETAILED DESCRIPTION OF THE SPECIFIC EMBODIMENT

Figure 1:
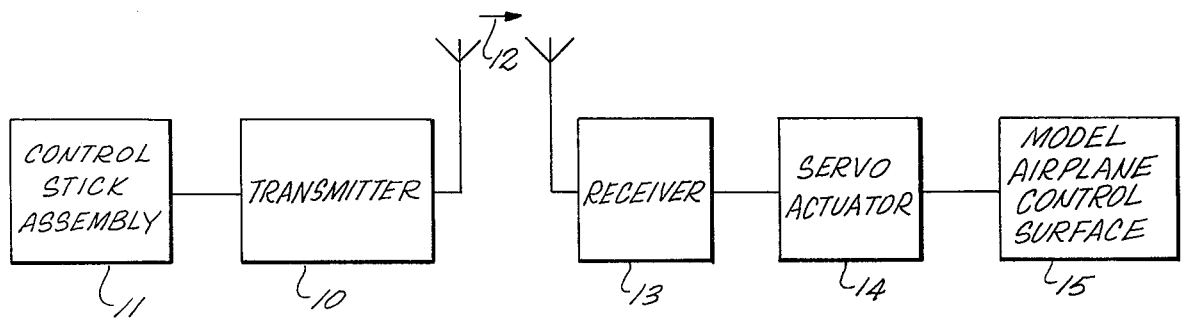
FIG. 1 is a schematic block diagram of a radio control system incorporating the invention.

In FIG. 1 a radio transmitter 10 generates a radio signal responsive to a control stick assembly 11. Typically, the pulse duration of the radio signal generated by transmitter 10 is proportional to the displacement of the control stick, which is operated by a human attendant. The radio signal represented at 12 is intercepted by a radio receiver 13 mounted with a servo actuator 14 in a model airplane remotely located from transmitter 10. Servo actuator 14 displaces a model airplane control surface 15 responsive to the radio signal intercepted by receiver 13. Control surface 15 could be an elevator, an aileron, or a rudder, or a different type of element such as a throttle could be controlled. Typically, the displacement of control surface 15 would be proportional to the duration of the pulses of the radio signal intercepted by receiver 13, and accordingly proportional to the displacement of the control stick introduced by the human attendant at transmitter 10 and control stick assembly 11.

Figure 2:
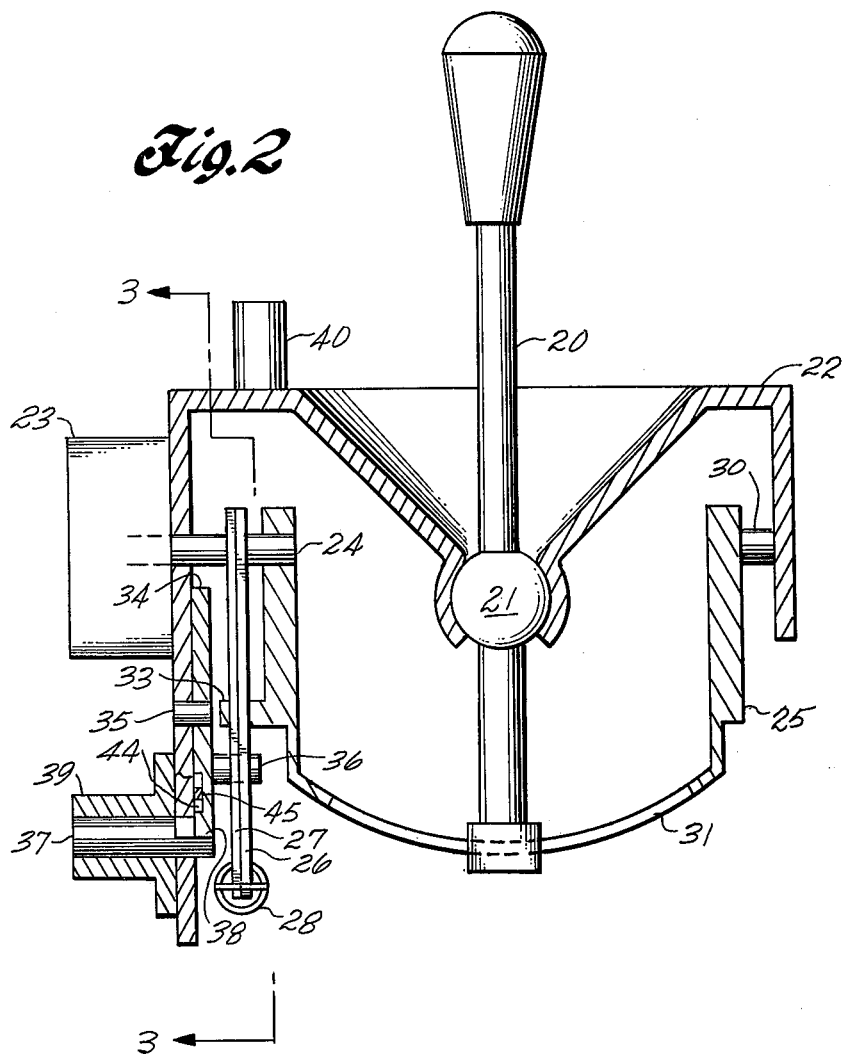
FIG. 2 is a front sectional view of the control stick assembly shown in block form in FIG. 1.

In FIGS. 2 and 3 a control stick 20 has a ball-and-socket connection 21 with a housing 22, thereby permitting control stick 20 to pivot relative to housing 22. A case 23 of a potentiometer is mounted in stationary fashion on the outside of housing 22. A rotatable shaft 24 of the potentiometer extends into the interior of housing 22. Rotation of shaft 24 changes the resistance of the potentiometer, which is part of the radio pulse generating circuit of transmitter 10. As a result, the pulse duration changes. One end of a pivotable, U-shaped linkage 25 is fixedly attached to shaft 24, and the other end of linkage 25 is rotatably attached to housing 22 by a pivot pin 30. The end of control stick 20 is captured in a slot 31 in linkage 25. When control stick 20 is displaced in a plane perpendicular to FIG. 2, such displacement is coupled by linkage 25 to shaft 24, which rotates a proportional amount. Spring levers 26 and 27 are mounted on shaft 24 so they are free to rotate relative thereto. A spring 28 interconnects lever arms 26 and 27 to urge them together. The end of linkage 25 attached to shaft 24 has a stop pin 33 disposed between lever arms 26 and 27. In practice, stop pin 33 and the coupling between linkage 25 and shaft 24 are a separate part, rather than being part of linkage 25. A disc 34 is rotatably attached to housing 22 by shaft 35. Thus, disc 34, when it rotates about the axis of shaft 35, tracks the movement of stop pin 33 when it rotates about the axis of shaft 24. Disc 34 has a stop pin 36 that is also disposed between lever arms 26 and 27. When stop pins 33 and 36 are aligned between and in abutment with both of lever arms 26 and 27 as illustrated in FIG. 3, control stick 20 is in its neutral position. Disc 34 is normally latched, so it cannot rotate. The end of a cylindrical, rotatable latching member 37 is segmented to form an edge 38. An actuator 39 normally urges latching member 37 in a clockwise direction, as viewed in FIG. 3, so edge 38 bears against the edge of disc 34, thereby fixing its position. When a trim command button 40 on the outside of housing 22 is depressed to give a discrete trim command signal, actuator 39 rotates member 37 in a counterclockwise direction, as viewed in FIG. 3, out of contact with the edge of disc 34, thereby releasing disc 34 so it can move under the influence of spring 28. When button 40 is released, edge 38 returns to its latching position against the edge of disc 34. Instead of latching member 37 and actuator 39, a commercially available, releasable brake mechanism could be used to control disc 34.

In operation, temporary changes in the position of the airplane control surface are introduced by operating control stick 20. When control stick 20 is displaced from its neutral position, stop pin 33 and lever arm 26 (or lever arm 27) rotate away from stop pin 36, as illustrated in FIG. 4. The force of spring 28 urges stop pin 33 back toward stop pin 36. Thus, when the attendant releases control stick 20, it returns to the neutral position. When it is desired to permanently hold the airplane control surface in its current position, the attendant depresses button 40 while maintaining the position of control stick 20. Disc 34 is thus unlatched by the trim command signal, and the force of spring 28 drives stop pin 36 toward stop pin 33 until they are in alignment, at which time a new neutral position for control stick 20 is established, as illustrated in FIG. 5. Button 40 need only be depressed momentarily to execute the trim maneuver, because the alignment of pins 33 and 36 after depressing button 40 occurs, in essence, instantaneously.

Figure 6:
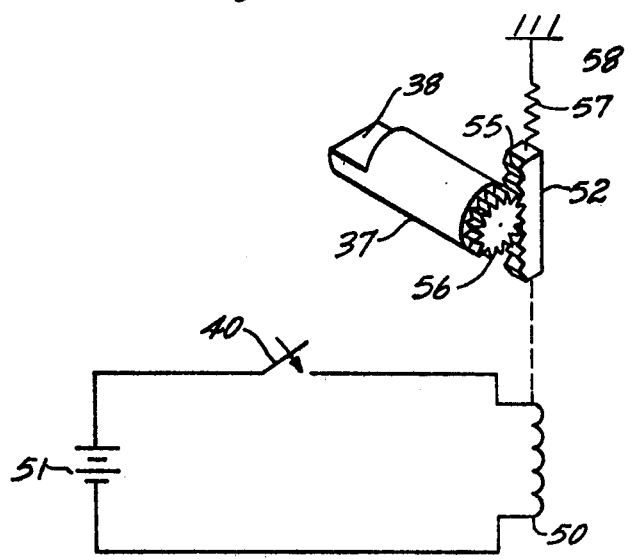
FIG. 6 is a schematic diagram of the arrangement for actuating the latching member.

As illustrated in FIG. 6, actuator 39 comprises a solenoid having a coil 50 and an armature 52. Pushbutton 40 has normally open electrical contacts connected in series with solenoid coil 50 across the terminals of a battery 51. Solenoid armature 52 magnetically coupled to coil 50 is supported by means not shown so as to move in translation toward and away from coil 50. Armature 52 has gear teeth 55 that mesh with gear teeth 56 on latching member 37, which is movable in rotation. Armature 52 and latching member 37 function as a rack and pinion to transform linear motion to rotational motion. A compression spring 57 is connected between armature 52 and a stationary reference point 58, which could be part of housing 22. Thus, while button 40 is not depressed, spring 57 urges armature 52 away from coil 50, thereby urging latching member 37 in a counter clockwise direction, as viewed in FIG. 6 (a clockwise direction as viewed in FIG. 4), and fixing the position of disc 34. When button 40 is depressed, coil 50 is energized, thereby attracting armature 52 toward it, rotating latching member 37 in a clockwise direction as viewed in FIG. 6, and unlatching disc 34. The solenoid-energizing current pulse produced by battery 51 when pushbutton 40 is depressed, constitutes a discrete trim command signal.

The range of rotation of disc 34 and, consequently, the range of movement of the neutral position of stick 20 is limited by an arcuate slot 44 formed in disc 34 and a peg 45 on the inside surface of housing 22. Peg 45 rides in slot 44, thereby limiting the range of trim adjustment that can be introduced. The range of trim adjustment is exaggerated in the drawings for purposes of illustration. Generally, the maximum trim that could be introduced would be limited by the length of slot 44 to approximately 10% to 20% of the total range of travel of stick 20. As a result, temporary changes of the position of the airplane control surface can be introduced irrespective of the neutral position without reaching the limits of travel of control stick 20.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the invention can be employed in a control system employing wire transmission rather than radio transmission, which would be appropriate if the control stick assembly is mounted on the same chassis as the element to be controlled.

What is claimed is:

1. A control stick assembly comprising:
    a movable control stick;
    first and second movable lever arms;
    means for urging the first and second lever arms together;
    a normally latched movable member;
    a first pin attached to the control stick and disposed between the first and second lever arms, the first pin being movable as the control stick moves to carry the first lever arm away from the second lever arm in opposition to the urging means when the movable member is latched, thereby resisting movement of the control stick;
    the normally latched movable member being adapted to track the movement of the first pin when unlatched;
    a second pin attached to the normally latched, movable member and disposed between the lever arms, the second pin being movable as the movable member moves when unlatched to permit the urging means to move the second lever arm toward the first lever arm, but being stationary and preventing the urging means for moving the second lever arm toward the first lever arm when the movable member is latched;
    means for unlatching the movable member to move the second pin toward the first pin responsive to the urging means; and
    means responsive to the movement of the control stick for producing a signal having a characteristic related to the control stick displacement.

2. The assembly of claim 1, in which the urging means is a spring interconnecting the first and second lever arms.

3. The assembly of claim 2, in which the signal producing means comprises a variable impedance element having a rotatable shaft the position of which determines the impedance of the element, the control stick is pivotable about a point, the first and second lever arms are rotatable about the shaft, and the normally latched member is rotatable about an axis parallel to the shaft.

4. The assembly of claim 3, in which the impedance element is a potentiometer.

5. The assembly of claim 4, in which the normally latched member is disc shaped.

6. The assembly of claim 5, in which the first pin has a given range of travel, the assembly additionally comprising means for limiting the movement of the movable member so the range of travel of the second pin is less than the given range.

7. The assembly of claim 1, in which the first pin has a given range of travel, the assembly additionally comprising means for limiting the movement of the movable member so the range of travel of the second pin is less than the given range.

8. In a remote control system having a displaceable control member, means for urging the control member toward a neutral position, means responsive to the displacement of the control member for generating an electrical signal, means for transmitting the electrical signal to a remote point, a displaceable element to be controlled at the remote point, and means responsive to the electrical signal for displacing the element to be controlled, the improvement comprising:
means responsive to a discrete trim command for moving the neutral position of the urging means to the position of the control member at the time the trim command is given.

9. The system of claim 8, in which the control member is a pivotable control stick.

10. The system of claim 8, in which the generating means comprises an electrical impedance element having a rotatable shaft the position of which changes the value of the impedance of the element.

11. The system of claim 10, in which the urging means comprises:
a pair of lever arms mounted on the shaft for rotation about the shaft;
a spring interconnecting the lever arms;
a first pin attached to the control stick and disposed between the lever arms;
a normally stationary support member; and
a second pin attached to the support member and disposed between the lever arms.

12. The system of claim 11, in which the means for moving the neutral position comprises means for freeing the support member to move so the second pin can follow the movement of the first pin.

13. The system of claim 8, in which the signal is a radio signal, the system additionally comprising means for receiving the radio signal at the remote point.

14. The assembly of claim 1, additionally comprising a push button to generate the trim command, the unlatching means being responsive to depression of the push button.

15. The assembly of claim 1, additionally comprising a housing for the parts of the assembly and a push button to generate the trim command on the outside of the housing, the unlatching means being responsive to depression of the push button, a portion of the control stick extending outside the housing near the push button.

16. The system of claim 8, additionally comprising a push button to generate the trim command, the means for moving the neutral position being responsive to depression of the push button.

* * * * *